(12) United States Patent
Tao et al.

(10) Patent No.: US 11,019,919 B2
(45) Date of Patent: Jun. 1, 2021

(54) PRESSURE-ADJUSTABLE GAS SPRING, LIFTING DEVICE AND LIFTING TABLE

(71) Applicant: JIANGSU JELT LIFTING SYSTEM CO., LTD., Changzhou (CN)

(72) Inventors: Shengrong Tao, Changzhou (CN); Xiaogang Li, Changzhou (CN)

(73) Assignee: JIANGSU JELT LIFTING SYSTEM CO., LTD., Changzhou (CN)

( * ) Notice: Subject to any disclaimer, the term of this patent is extended or adjusted under 35 U.S.C. 154(b) by 0 days.

(21) Appl. No.: 16/834,615

(22) Filed: Mar. 30, 2020

(65) Prior Publication Data

US 2020/0337451 A1 Oct. 29, 2020

(30) Foreign Application Priority Data

Apr. 23, 2019 (CN) .......................... 201910327667.5

(51) Int. Cl.
*A47B 9/00* (2006.01)
*A47B 9/10* (2006.01)
(Continued)

(52) U.S. Cl.
CPC ................. *A47B 9/10* (2013.01); *A47B 9/20* (2013.01); *A47B 13/02* (2013.01); *F16F 9/0245* (2013.01);
(Continued)

(58) Field of Classification Search
CPC .... A47B 9/10; A47B 9/12; A47B 9/20; A47B 13/02; A47B 2200/0052; A47B 2200/0057; F16F 9/0245; F16F 9/0281; F16F 9/44
See application file for complete search history.

(56) References Cited

U.S. PATENT DOCUMENTS 3,521,341 A * 7/1970 Hornlein ................... F16B 7/10
29/898.066
9,038,549 B1 * 5/2015 Zebarjad .................. A47B 9/02
108/147
(Continued)

FOREIGN PATENT DOCUMENTS

| CN | 206275358 U | * | 6/2017 | |
| CN | 207005175 U | * | 2/2018 | ................ F16F 9/34 |
| DE | 4023768 A1 | * | 1/1992 | ................ A47B 9/10 |

OTHER PUBLICATIONS

English Translation of Tao (CN206275358) (Year: 2020).*

Primary Examiner — Matthew W Ing
(74) Attorney, Agent, or Firm — Bayramoglu Law Offices LLC

(57) ABSTRACT

A pressure-adjustable gas spring includes a first gas spring and a gas source for adjusting a pressure. One end of the gas source is connected with the first gas spring and another end is connected with an adjustment device for adjusting the volume of the gas source. The adjustment device includes a cavity for accommodating the gas source and a piston. One end of the piston opposite the gas source is connected with a driving subassembly. The driving subassembly includes a screw. One end of the screw is connected with the piston and another end extends out of the cavity. A nut is arranged on the end of the screw extending out of the cavity. A connection tube is arranged outside the nut in a sleeving manner. One end of the connection tube is connected with the cavity and a rotating block is mounted at an opening of another end.

11 Claims, 4 Drawing Sheets

(51) Int. Cl.
  *A47B 9/20* (2006.01)
  *A47B 13/02* (2006.01)
  *F16F 9/02* (2006.01)
  *F16F 9/44* (2006.01)

(52) U.S. Cl.
  CPC .............. *F16F 9/0281* (2013.01); *F16F 9/44* (2013.01); *A47B 2200/0052* (2013.01); *A47B 2200/0057* (2013.01)

(56) References Cited

U.S. PATENT DOCUMENTS

| | | | |
|---|---|---|---|
| 9,504,315 B2 * | 11/2016 | Hansen | A47B 9/10 |
| 2005/0116399 A1 * | 6/2005 | Jordan | F16F 9/0245 |
| | | | 267/64.11 |
| 2012/0227642 A1 * | 9/2012 | Sekikawa | A47B 9/10 |
| | | | 108/147 |
| 2018/0064241 A1 * | 3/2018 | Tseng | F15B 15/1409 |
| 2020/0037753 A1 * | 2/2020 | Ko | A47B 9/10 |
| 2020/0121072 A1 * | 4/2020 | Tao | A47B 9/14 |
| 2020/0163451 A1 * | 5/2020 | Tao | A47B 9/10 |

\* cited by examiner

PRESSURE-ADJUSTABLE GAS SPRING, LIFTING DEVICE AND LIFTING TABLE

TECHNICAL FIELD

The present invention relates to the field of lifting table devices, and more particularly relates to a pressure-adjustable gas spring, a lifting device and a lifting table.

BACKGROUND ART

In most of current lifting tables, mechanical devices, hydraulic rods and gas pressure rods are adjusted by manpower. At present, during lifting of the lifting table, rollers on a retainer will rotate, so that certain smoothness may be generated for vertical column outer tubes in the lifting process. A roller form is generally used on the current retainer, but this structure is relatively single and low in smoothness. Furthermore, a height for lifting is not high enough, and a height for adjustment is relatively single and has no choice.

SUMMARY OF THE INVENTION

The objective of the present invention is to provide a pressure-adjustable gas spring, a lifting device and a lifting table, which provide a good smooth effect and can realize lifting at a relatively great height.

The technical solution of the present invention is as follows.

A pressure-adjustable gas spring includes a first gas spring, and also includes a gas source for adjusting a pressure. One end of the gas source is connected with the first gas spring, and the other end of the gas source is connected with an adjustment device for adjusting the volume of the gas source.

The adjustment device includes a cavity for accommodating the gas source, and a piston; and one end, away from the gas source, of the piston is connected with a driving subassembly.

The driving subassembly includes a screw. One end of the screw is connected with the piston, and the other end of the screw extends out of the cavity.

A nut is arranged on the extending end, extending out of the cavity, of the screw in a sleeving manner. A connection tube is arranged outside the nut in a sleeving manner. One end of the connection tube is connected with the cavity. A rotating block is mounted at an opening of the other end of the connection tube. A hexagonal hole is formed on the rotating block.

A first inner fixed tube, a second inner fixed tube and a cross beam subassembly stretching across the first and second inner fixed tubes are also included. A first gas spring of the pressure-adjustable gas spring is arranged in the first inner fixed tube. A lifting end of the first gas spring is connected with the cross beam subassembly. A second gas spring is arranged in the second inner fixed tube. A lifting end of the second gas spring is connected with the cross beam subassembly.

A synchronization mechanism is also included. The synchronization mechanism includes: a first bracket, where one end of the cross beam subassembly is connected with one end of the first bracket, and the other end of the first bracket is clearance fit in the first inner fixed tube;

a second bracket, where the other end of the cross beam subassembly is connected with one end of the second bracket, and the other end of the second bracket is in clearance fit in the second inner fixed tube;

a first flexible traction component, where one end of the first flexible traction component is connected with the second inner fixed tube, and after the first flexible traction component is flexibly fitted to one end of the second bracket, one end of the first bracket and the other end of the first bracket, the other end of the first flexible traction component is connected with the first inner fixed tube; and a second flexible traction component, where one end of the second flexible traction component is connected with the first inner fixed tube, and after the second flexible traction component is flexibly fitted to one end of the first bracket, one end of the second bracket and the other end of the second bracket, the other end of the second flexible traction component is connected with the second inner fixed tube.

The first inner fixed tube includes a first inner tube and a first connection piece. The first connection piece is located in the first inner tube and fixed to the first inner tube. The second inner fixed tube includes a second inner tube and a second connection piece. The second connection piece is located in the second inner tube and fixed to the second inner tube. One end of the first flexible traction component is fixedly connected with the second connection piece, and the other end of the first flexible traction component is fixedly connected with the first inner fixed tube. One end of the second flexible traction component is fixedly connected with the first connection piece, and the other end of the second flexible traction component is connected with the second inner fixed tube. The first bracket includes: a first bracket body; a first turning component rotatably mounted on a first shaft in one end of the first bracket body; a second turning component rotatably mounted at the other end of the first shaft; and a third turning component rotatably mounted at the other end of the first bracket body. The second bracket includes a second bracket body; a fourth turning component rotatably mounted on a second shaft in one end of the second bracket body; a fifth turning component rotatably mounted at the other end of the second shaft; and a sixth turning component rotatably mounted at the other end of the second bracket body. The first flexible traction component is flexibly fitted to the fourth turning component, the first turning component and the third turning component. The second flexible traction component is fitted to the second turning component, the fifth turning component and the sixth turning component. The lifting device also includes: a first movable outer tube with one end fixed to one end of the cross beam subassembly, where the first movable outer tube is arranged on the first inner fixed tube in a sleeving manner; and a second movable outer tube with one end fixed to the other end of the cross beam subassembly, where the second movable outer tube is arranged on the second inner fixed tube in a sleeving manner. A first sliding guide subassembly arranged between the first movable outer tube and the first inner tube, and a second sliding guide subassembly arranged between the first movable outer tube and the first inner tube are also included.

The first sliding guide subassembly and the second sliding guide subassembly each include two side plate subassemblies arranged oppositely. The two side plate subassemblies are detachably connected. Each of the side plate subassemblies is formed by hinging a first side plate with a second side plate. First rolling groups are arranged at the upper ends of both the first and second side plates. Second rolling groups are arranged at the lower ends of both the first and second side plates. The first rolling groups and the second rolling groups include left and right waist-shaped ring slots. A plurality of balls are uniformly distributed in the waist-shaped ring slots.

The cross beam subassembly has two side walls and a bottom wall. The two side walls and the bottom wall form a slot with openings in two ends in an encircling manner, and each of the openings is connected with a rotating joint. Open slots are formed on bottom surfaces of the rotating joints. The two open slots respectively provide spaces when the first bracket, the second bracket, the first flexible traction component and the second flexible traction component move.

A lifting table with a pressure-adjustable gas spring includes the lifting device with a pressure-adjustable gas spring. A tabletop board is arranged on a cross beam subassembly. A bottom end of a first inner fixed tube is connected with a first supporting foot, and a bottom end of a second inner fixed tube is connected with a second supporting foot.

The present invention has the beneficial effects that: by arranging a pressure tube and communicating a gas outlet end of the pressure tube to an outer gas cavity of a first gas pressure rod, when the pressure tube pressurizes the outer gas cavity of the first gas pressure rod, the pressure bearing capacity of the first gas pressure rod can be greatly increased, and the gas pressure rod is lifted to a higher position. On the other hand, with the adoption of the pressure tube, a user can inflate the pressure tube according to a site condition when feeling that the height of the table is not enough, so as to increase the pressure of the pressure tube to the outer gas cavity of the first gas pressure rod, and to obtain a greater height, and therefore better selectivity is achieved. With the arrangement of a rear plug, the sealing property of a joint can be greatly improved.

BRIEF DESCRIPTION OF THE DRAWINGS

The abovementioned and other objectives, features and advantages of the present invention will be apparent from accompanying drawings and detailed descriptions below.

Figure 1:
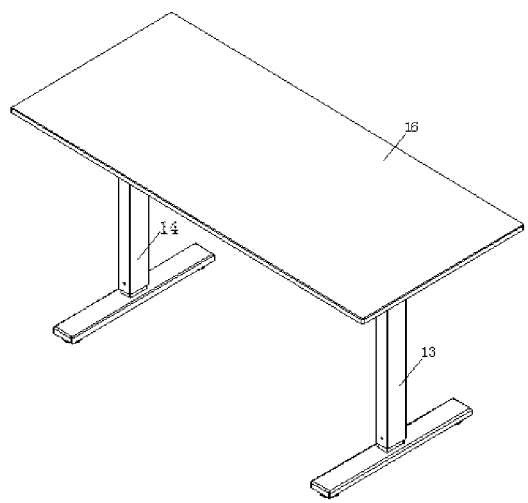
FIG. 1 is a structural schematic diagram of the present invention.

In the drawings: 1: first gas spring; 2: gas source; 3: cavity; 4: piston; 5: driving subassembly; 6: first inner fixed tube; 7: second inner fixed tube; 8: cross beam subassembly; 9: first bracket; 10: second bracket; 11: first flexible traction component; 12: second flexible traction component; 13: first movable outer tube; 14: second movable outer tube; 15: first sliding guide group; 16: tabletop;

501: screw; 502: rotating handwheel; 503: nut; 504: connection tube; 505: rotating block;

901: first hole; 902: first shaft; 903: first bracket body; 904: first turning component; 905: second turning component; 906: first mandrel; 907: third turning component;

1001: second hole; 1002: second shaft; 1004: second bracket body; 1005: fourth turning component; 1006: fifth turning component; 1008: sixth turning component;

1501: first side plate; 1502: second side plate; 1503: ring slot; 1504: ball; 1506: limiting block piece;

101: U-shaped frame; 601: first pressure block; 701: second pressure block;

801: side wall; 802: bottom wall; 803: slot; 804: rotating joint; 805: open slot; 806: mounting hole; and 807: arc-shaped open slot.

DETAILED DESCRIPTION OF THE INVENTION

Referring to FIG. 1, as shown in FIGS. 1 to 7, a pressure-adjustable gas spring of the present invention includes a first gas spring 1, and also includes a gas source 2 for adjusting a pressure. One end of the gas source is connected with the first gas spring, and the other end of the gas source is connected with an adjustment device for adjusting the volume of the gas source. The various parts and relations therebetween are described below in detail.

Figure 3:
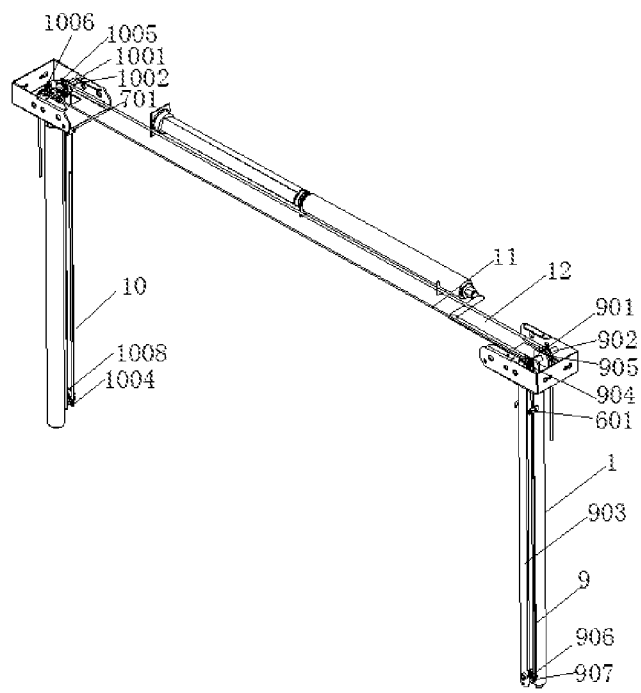
FIG. 3 is a structural schematic diagram of a first bracket of the present invention.
Figure 4:
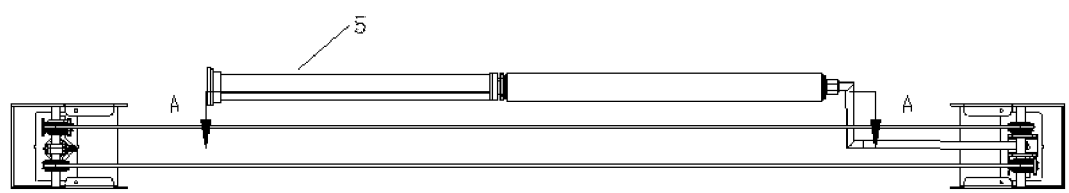
FIG. 4 is a structural schematic diagram of a driving device of the present invention.
Figure 5:
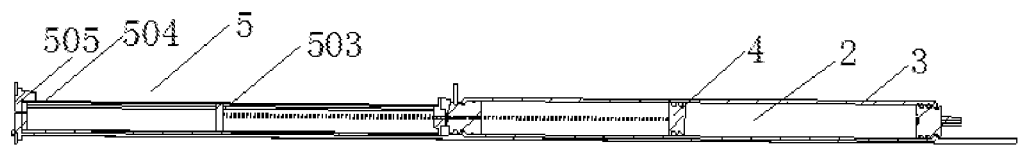
FIG. 5 is a structural schematic diagram of a cross section A-A of the present invention.
Figure 6:
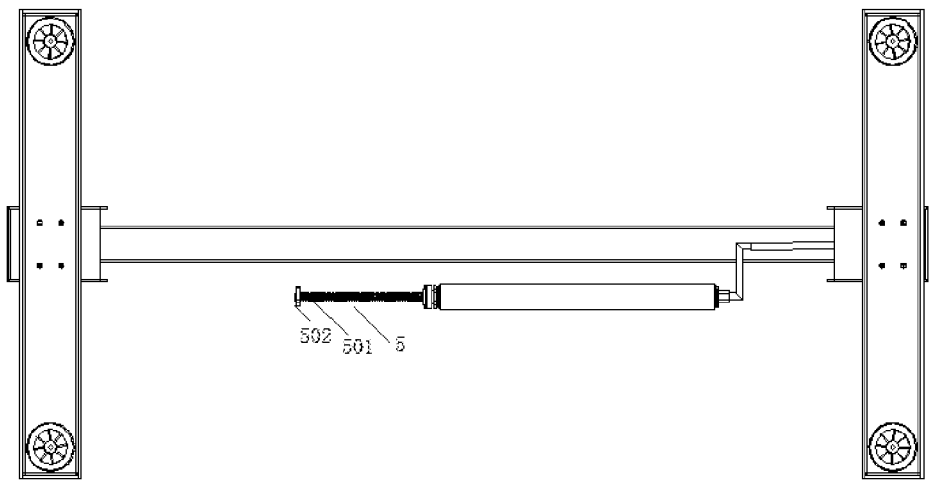
FIG. 6 is a structural schematic diagram of a screw of the present invention.
Figure 7:
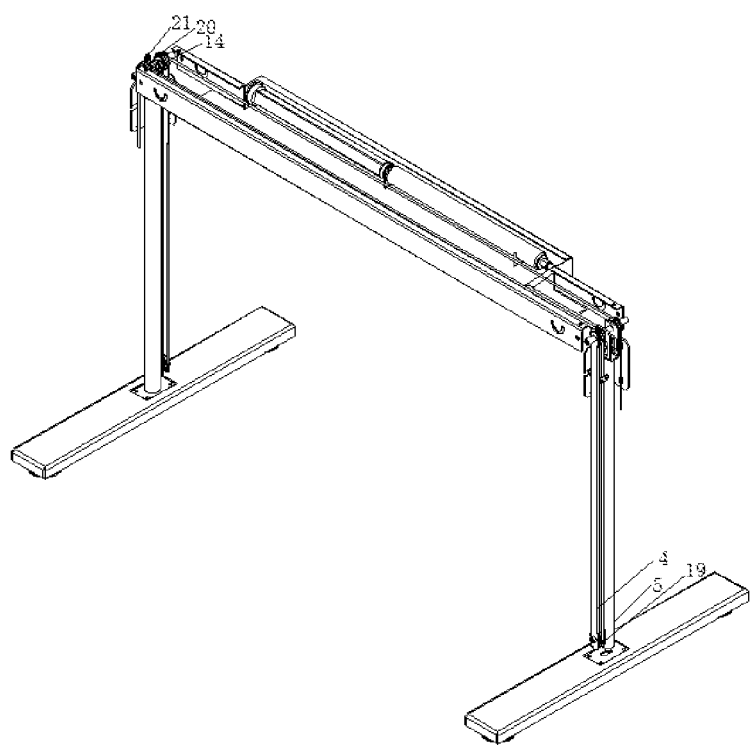
FIG. 7 is a structural schematic diagram of a fourth turning component of the present invention.

As shown in FIGS. 3 and 5, in one or more implementation manners, the adjustment device includes a cavity 3 for accommodating the gas source, and a piston 4. One end, away from the gas source, of the piston is connected with a driving subassembly 5. The driving subassembly drives the piston to do reciprocating motion in the cavity to change the volume of the gas source, so as to adjust the pressure in the first gas spring connected with the gas source and achieve the pressure adjustability, which enables the gas spring to bear higher pressure and gravity. FIGS. 5 and 6 illustrate several implementation manners of the driving subassembly. There are several specific embodiments below: 1) the driving subassembly includes a screw 501; one end of the screw is connected with the piston, and the other end of the screw extends out of the cavity; a rotating handwheel 502 is mounted at the extending end, extending out of the cavity, of the screw; rotation of the rotating handwheel drives the screw to do reciprocating motion, so as to drive the piston connected with the screw to move; and 2) a nut 503 is arranged at the extending end, extending out of the cavity, of the screw in a sleeving manner, and a connection tube 504 is arranged outside the nut in a sleeving manner; one end of the connection tube is connected with the cavity, and a rotating block 505 is mounted at an opening of the other end of the connection tube; a hexagonal hole is formed on the rotating block; the hexagonal hole may be connected with an external wrench for use; rotation of the wrench drives the connection tube to rotate; the rotation of the connection tube drives the nut to rotate since the connection tube is connected with the nut; and the rotation of the nut drives the screw to do front-back reciprocating motion since the position of the connection tube is fixed, and thus the piston in the cavity is pushed to squeeze the gas source, so that gas of the gas source flows into the first gas spring, thereby adjusting the pressure of the gas spring.

A lifting device with a pressure-adjustable gas spring includes the pressure-adjustable gas spring, a first inner fixed tube 6, a second inner fixed tube 7 and a cross beam subassembly 8 stretching across the first and second inner fixed tubes. A first gas spring of the pressure-adjustable gas spring is arranged in the first inner fixed tube. A lifting end of the first gas spring is connected with the cross beam subassembly. A second gas spring is arranged in the second inner fixed tube. A lifting end of the second gas spring is connected with the cross beam subassembly. The various parts and relations therebetween are described below in detail.

Figure 2:
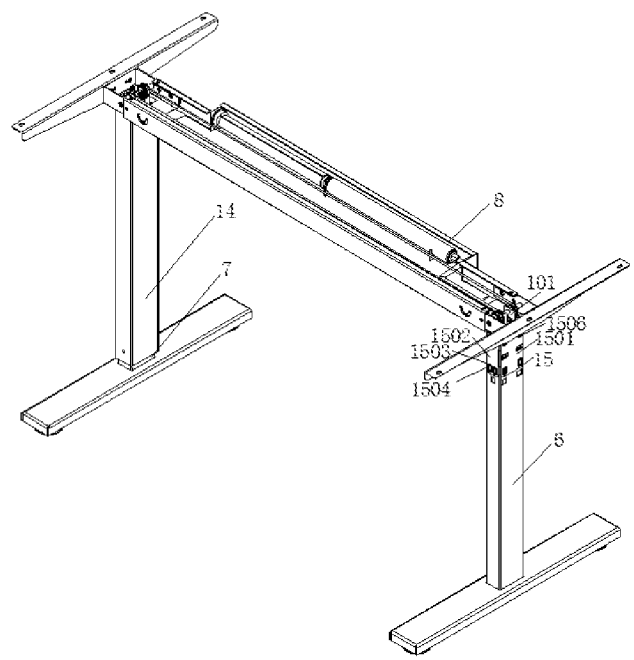
FIG. 2 is a structural schematic diagram of a first flexible traction component of the present invention.

As shown in FIG. 2, in one or more implementation manners, the first inner fixed tube and the second inner fixed tube are connected with each other by the cross beam subassembly. The pressure-adjustable first gas spring is arranged in the first inner fixed tube, and the gas source of the first gas spring may be located inside the first inner fixed tube, and also may be located outside the first inner fixed tube. The first gas spring drives one side of the cross beam subassembly to do reciprocating motion when being actuated, and the second gas spring in the second inner fixed tube drives the other side of the cross beam subassembly to do reciprocating motion when being actuated, so as to realize lifting. Furthermore, since the first gas spring is connected with the gas source, the pressure adjustment may be realized, and the cross beam subassembly may bear greater pressure and gravity.

As shown in FIGS. 2 to 7, a synchronization mechanism includes: a first bracket 9, a second bracket 10, a first flexible traction component 11 and a second flexible traction component 12. The structure of the synchronization mechanism is described in detail below.

The other end of the first bracket is in clearance fit in the first inner fixed tube, and one end of the first bracket is connected with one end of the cross beam subassembly. When an output end of the first gas spring is connected with the cross beam subassembly, the lifting of the output end of the first gas spring drives the cross beam subassembly and the first bracket to do lifting motion. The other end of the second bracket is in clearance fit in the second inner fixed tube, and one end of the second bracket is connected with the other end of the cross beam subassembly. The lifting of an output end of the second gas spring drives the cross beam subassembly and the second bracket to do lifting motion. A preferred connection mode for the first bracket and the first gas spring and a preferred connection mode for the second bracket and the second gas spring use a structure as disclosed in the patent NO. CN108703495, and descriptions thereof are omitted herein.

When the end, away from the output end, of the first gas spring is connected with the cross beam subassembly and the first gas spring is actuated, since the output end is fixed, the end, away from the output end, of the first gas spring will do lifting motion and drive the cross beam subassembly and the first bracket to do lifting motion. The preferred connection mode for the first bracket and the first gas spring is that first holes 901 are formed in one end of the first bracket; a U-shaped frame is arranged at the lifting end of the first gas spring; and a first shaft 902 passes through the two first holes and mounting holes in two sides of the U-shaped frame, such that the first gas spring and the first bracket are connected into a whole. Preferably, one portion of the first bracket is located in the first inner fixed tube, and one portion of the first gas spring is also located in the first inner fixed tube. There is no connection among the first bracket, the first gas spring and the first inner fixed tube. Therefore, when the lifting end of the first gas spring is lifted to drive the first bracket to be lifted, the first inner fixed tube cannot move. One end of the second bracket is connected with the lifting end of the second gas spring. The second bracket is lifted along with the lifting of the second gas spring. A preferred connection mode for the second bracket and the second gas spring is that second holes 1001 are formed in one end of the second bracket; a second mounting hole is formed in the lifting end of the second gas spring; and a second shaft 1002 passes through the two second holes and the second mounting hole such that the second gas spring and the second bracket are connected into a whole. Preferably, one portion of the second bracket is located in the second inner fixed tube, and one portion of the second gas spring is also located in the second inner fixed tube. There is no connection among the second bracket, the second gas spring and the second inner fixed tube. Therefore, when the lifting end of the second gas spring is lifted to drive the second bracket to be lifted, the second inner fixed tube cannot move.

As shown in FIGS. 3 to 7, the first bracket includes: a first bracket body 903, a first turning component 904, a second turning component 905 and the first shaft. The first turning component is rotatably mounted on the first shaft in one end of the first bracket body. The second turning component is rotatably mounted at the other end of the first shaft. A third turning component is rotatably mounted at the other end of the first bracket body. The cross section of the first bracket body is U-shaped. Preferably, the first bracket body is channel steel. The first turning component and the second turning component are both located on the first shaft in one end of the first bracket body. The first shaft passes through the first turning component and the second turning component, so that the first turning component and the second turning component are supported by the first shaft, and thus may turn. The third turning component 907 is located in a slot at the other end of the first bracket body. The third turning component is supported by a first mandrel 906 (not shown in the figures), and thus may turn. The first turning component, the second turning component and the third turning component are one of bearings or rollers or chain wheels.

As shown in FIGS. 3 to 7, the second bracket includes: a second bracket body 1004, a fourth turning component 1005, a fifth turning component 1006 and the second shaft. The fourth turning component is rotatably mounted on the second shaft in one end of the second bracket body. The fifth turning component is rotatably mounted at the other end of the second shaft. A sixth turning component 1008 is rotatably mounted at the other end of the second bracket body. The cross section of the second bracket body is U-shaped. Preferably, the second bracket body is channel steel. The fourth turning component and the fifth turning component are both located on the second shaft in one end of the second bracket body. The second shaft passes through the fourth turning component and the fifth turning component, so that the fourth turning component and the fifth turning component are supported by the second shaft, and thus may turn. The sixth turning component is located in a slot at the other end of the second bracket body. The sixth turning component is supported by a second mandrel (not shown in the figures), and thus may turn. The fourth turning component, the fifth turning component and the sixth turning component are one of bearings or rollers or chain wheels.

As shown in FIGS. 2 to 7, one end of the first flexible traction component is fixedly connected with the second inner fixed tube. After the first flexible traction component is flexibly fitted to one end of the second bracket, one end of the first bracket and the other end of the first bracket, the other end of the first flexible traction component is fixedly connected with the first inner fixed tube. Preferably, the first flexible traction component is flexibly fitted to the fifth turning component, the first turning component and the third turning component. This flexible fit is similar to a fitting mode of a belt and a belt wheel, that is, the first flexible traction component is tensioned by the fifth turning component, the first turning component and the third turning component.

As shown in FIGS. 2 to 7, one end of the second flexible traction component is fixedly connected with the first inner fixed tube. After the second flexible traction component is flexibly fitted to one end of the first bracket, one end of the second bracket and the other end of the second bracket, the other end of the second flexible traction component is fixedly connected with the second inner fixed tube. The second flexible traction component is flexibly fitted to the second turning component, the fourth turning component and the sixth turning component. This flexible fit is similar to the fitting mode of the belt and the belt wheel, that is, the second flexible traction component is tensioned by the sixth turning component, the second turning component and the fourth turning component.

As shown in FIGS. 2 to 7, the first inner fixed tube includes a first inner tube and a first connection piece. A bottom end of the first inner tube is connected with a first supporting foot. At least one portion of the first connection piece is located in the first inner tube and fixed to the first inner tube. The first connection piece consists of a first U-shaped connection part and first bent connection parts formed by bending two ends of the first U-shaped connection part. A first through hole is formed on a tube wall of the first inner tube. The first U-shaped connection part passes through the first through hole and is located in the first inner tube. The first bent connection parts are located outside the first inner tube and are fixedly connected with the first inner tube. The second inner fixed tube includes a second inner tube and a second connection piece. At least one portion of the second connection piece is located in the second inner tube and fixed to the second inner tube. The second connection piece consists of a second U-shaped connection part and second bent connection parts formed by bending two ends of the second U-shaped connection part. A second through hole is formed on a tube wall of the second inner tube. The second U-shaped connection part passes through the second through hole and is located in the second inner tube. The second bent connection parts are located outside the second inner tube and are fixedly connected with the second inner tube. A connection mode for the first and second connection pieces and the inner tubes uses a structure as disclosed in the patent NO. CN108703495, and descriptions thereof are omitted herein. Or, the first and second connection pieces may also be fixed by fixing sheets formed by perforating and bending the inner tubes.

As shown in FIGS. 2 to 7, one end of the first flexible traction component is fixedly connected with the second connection piece, and the other end of the first flexible traction component is fixedly connected with the first inner fixed tube. One end of the second flexible traction component is fixedly connected with the first connection piece, and the other end of the second flexible traction component is connected with the second inner fixed tube. Preferably, the other end of the second flexible traction component is fixedly connected with a second pressure block 701 in the second inner fixed tube through a screw or a pin. One end of the second flexible traction component is fixedly connected with the first U-shaped connection part of the first connection piece through a screw or pin. The other end of the first flexible traction component is fixedly connected with a first pressure block 601 in the first inner fixed tube through a screw or pin. One end of the first flexible traction component is fixedly connected with the second U-shaped connection part of the second connection piece through a screw or pin.

As shown in FIGS. 2 to 7, the first flexible traction component and the second flexible traction component are respectively one of rope-form components or ribbon-form components or steel wires or chains. When the first flexible traction component and the second flexible traction component are the rope-form components or ribbon-form components or steel wires, the first turning component, the second turning component, the third turning component, the fourth turning component, the fifth turning component and the sixth turning component are the bearings or rollers. Grooves are formed on the outer circumferential surfaces of these bearings or rollers, and are fitted to the first flexible traction component and the second flexible traction component.

As shown in FIGS. 2 to 7, when the first flexible traction component and the second flexible traction component are the chains, the first turning component, the second turning component, the third turning component, the fourth turning component, the fifth turning component and the sixth turning component are chain wheels.

As shown in FIGS. 1 to 6, a table of the present invention also includes a cross beam subassembly, a first movable outer tube 13 and a second movable outer tube 14. One end of the cross beam subassembly is fixed to the lifting end of the first gas spring through the first shaft. The other end of the cross beam subassembly is fixed to the lifting end of the second gas spring through the second shaft. In this way, when the lifting ends of the first gas spring and the second gas spring are lifted, the cross beam subassembly is lifted along with the first gas spring and the second gas spring.

As shown in FIGS. 1 to 6, one end of the first movable outer tube is fixed to one end of the cross beam subassembly, and the first movable outer tube is lifted with the lifting of the cross beam subassembly. The first movable outer tube is arranged on the first inner fixed tube in a sleeving manner, that is, the first movable outer tube is arranged on the first inner tube in the sleeving manner. A first sliding subassembly is mounted on the first inner tube. Preferably, the first sliding subassembly is fixed on an outer circumferential surface of the other end of the first inner tube. The first sliding subassembly 15 is matched with an inner wall surface of the second movable outer tube to guide the lifting of the second movable outer tube. The first sliding guide subassembly includes two side plate subassemblies arranged oppositely. The two side plate subassemblies are detachably connected with each other. Each of the side plate subassemblies is formed by hinging a first side plate 1501 with a second side plate 1502. First rolling groups are arranged at upper ends of both the first and second side plates. Second rolling groups are arranged at lower ends of both the first and second side plates. Each of the first rolling groups and the second rolling groups includes left and right waist-shaped ring slots 1503. A plurality of balls 1504 are uniformly distributed in the waist-shaped ring slots. By placing a circle of the balls in each ring slot and adopting a rolling mode of the balls, no laggy phenomenon is easily caused in the lifting motion of vertical column outer tubes on the outer sides of lifting seats, and the movement is smoother.

As shown in FIGS. 1 to 6, one end of the second movable outer tube is fixed to the other end of the cross beam subassembly, and the second movable outer tube is lifted along with the lifting of the cross beam subassembly. The second movable outer tube is arranged on the second inner fixed tube in a sleeving manner, that is, the second movable outer tube is arranged on the second inner tube in the sleeving manner. A second sliding subassembly is mounted on the second inner tube. Preferably, the second sliding subassembly is fixed on an outer circumferential surface of the other end of the second inner tube. The second sliding subassembly is matched with an inner wall surface of the second movable outer tube to guide the lifting of the second movable outer tube. The second sliding guide subassembly includes two side plate subassemblies arranged oppositely. The two side plate subassemblies are detachably connected with each other. Each of the side plate subassemblies is formed by hinging a first side plate with a second side plate. First rolling groups are arranged at upper ends of both the first and second side plates. Second rolling groups are arranged at lower ends of both the first and second side plates. Each of the first rolling groups and the second rolling groups includes left and right waist-shaped ring slots. A plurality of balls are uniformly distributed in the waist-shaped ring slots.

An open slot is formed on a long side edge of at least one side of each waist-shaped ring slot. By forming the open slot, the long side edge of the ring slot is deeper. When the balls are squeezed, a bigger squeezing tool is provided, so that the matching effect is better when the vertical column outer tubes do the lifting motion.

An outer rim of each waist-shaped ring slot (which is similar to the shape of a standard elliptical track, which is formed by connecting two straight slots with two semicircular slots) extends upwards and bends inwards to form a limiting block piece matched with the shape of the outer rim of the ring slot. The arrangement of the limiting block pieces 1506 prevents the balls from falling out of the grooves.

Mounting slots are formed in long side plates of retainer bodies between the first rolling groups and the second rolling groups. The arrangement of the mounting slots is favorable for mounting the sliding guide subassemblies.

A tabletop 16 is fixed to the synchronization mechanism in a synchronous lifting mechanism. The tabletop is fixed to the cross beam subassembly.

The gas source is located on the cross beam subassembly. The gas source of the pressure-adjustable gas spring is connected with the first gas spring through a gas inlet tube.

The lifting end of the first gas spring is an end away from the output end. A side surface of a shell on a side, close to the output end, of the first gas spring is connected with the first bracket through a connection shaft.

Figure 8:
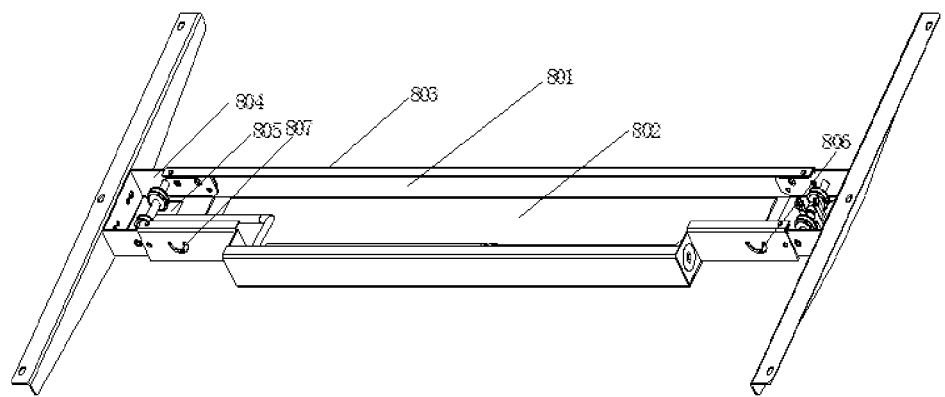
FIG. 8 is a structural schematic diagram of a cross beam subassembly of the present invention.

The cross beam subassembly may specifically be a cross beam or a power transmission component structure as disclosed in the patent NO. CN109315925, and descriptions thereof are omitted herein. The cross beam subassembly may also be a structure as shown in FIG. 8. The cross beam subassembly includes a side wall 801 and a bottom wall 802. Two side walls are preferred. The two side walls and the bottom wall form a slot 803 with openings in two ends in an encircling manner, and each of the openings is connected with a "U"-shaped rotating joint 804. Open slots 805 are formed on bottom surfaces of the rotating joints. The two open slots respectively provide spaces when the first bracket, the second bracket, the first flexible traction component and the second flexible traction component move. The formed slots may accommodate the first flexible traction component and the second flexible traction component, such that the first flexible traction component and the second flexible traction component are invisible from the outside. Specifically, two sides of each side wall extend outwards to form extending sections, and arc-shaped open slots are formed on the extending sections. At least one mounting hole 806 cooperatively used with the arc-shaped open slots is formed in a position, corresponding to the arc-shaped open slots 807, on the rotating joints. Two mounting holes are preferred. Here, the rotating joints are detachably connected into the slots, and the rotating joints on two sides of the slots are respectively connected with the first bracket (and the first inner fixed tube and the first movable outer tube) and the second bracket (and the second inner fixed tube and the second movable outer tube), so that the inwards rotating installation of the rotating joints also correspondingly drive the first bracket (and the first inner fixed tube and the first movable outer tube) and the second bracket (and the second inner fixed tube and the second movable outer tube) to rotate inwards respectively. In a transportation process, the rotating joints rotate inwards, and then are connected with the slots through bolts and the mounting holes, so as to effectively achieve a storage effect and facilitate the transportation. When the rotating joints are transported to a destination and need to be assembled, the bolts are removed only, and the rotating joints are rotated outwards, and then are connected with the slots through the bolts and the mounting holes for installation.

A working process of the present invention is as follows: when the tabletop of the table needs to rise up, the first gas spring and the second gas spring are actuated through switches; the first gas spring transmits power to the first shaft, and the second gas spring transmits power to the second shaft; the first shaft and the second shaft drive the cross beam subassembly, the tabletop, the first bracket body and the second bracket body to rise up; the first turning component and the second turning component are connected with the first bracket body through the first shaft, the third turning component is connected with the first bracket body through the first mandrel, the fourth turning component and the fifth turning component are connected with the second bracket body through the second shaft, and the sixth turning component is connected with the first bracket body through the second mandrel, so that when the first bracket body and the second bracket body rise up, the first turning component, the second turning component and the third turning component rise up along with the first bracket body, and the fourth turning component, the fifth turning component and the sixth turning component rise up along with the second bracket body, but the first connection piece and the second connection piece cannot move; at the moment, a distance between the first connection piece and the third turning component is shortened, and a distance between the second connection piece and the sixth turning component is shortened; the first turning component and the fifth turning component generate upward pulling action on the first flexible traction component to force the first flexible traction component to move in a moving direction from the first turning component to the fifth turning component; the second turning component and the fourth turning component generate upward pulling action on the second flexible traction component to force the second flexible traction component to move in a moving direction from the fourth turning component to the second turning component; in this way, when the first gas spring and the second gas spring rise up, the first flexible traction component and the second flexible traction component generate constraining action on the first gas spring and the second gas spring, so that the first gas spring and the second gas spring rise up synchronously; and on the contrary, when the first gas spring and the second gas spring fall down, the first flexible traction component and the second flexible traction component similarly generate constraining action on the first gas spring and the second gas spring, so that the first gas spring and the second gas spring fall down synchronously.

The above is only preferred embodiments of the present invention, and is not intended to limit the present invention in any way. Any simple modifications and equivalent changes that are made to the above embodiments in accordance with the technical essence of the present invention shall fall within the protection scope of the present invention.

What is claimed is:

1. A pressure-adjustable gas spring, comprising a first gas spring, and a gas source for adjusting a pressure, wherein one end of the gas source is connected with the first gas spring, and another end of the gas source is connected with an adjustment device for adjusting the volume of the gas source, the adjustment device includes a cavity for accommodating the gas source, and a piston, one end of the piston opposite the gas source is connected with a driving subassembly, the driving subassembly comprises a screw, and one end of the screw is connected with the piston and another end of the screw extends out of the cavity, wherein
- a nut is arranged on the end of the screw extending out of the cavity, a connection tube is arranged outside the nut in a sleeving manner, one end of the connection tube is connected with the cavity, a rotating block is mounted at an opening of an other end of the connection tube, and the rotating block is adapted for receiving a working end of a tool.

2. A lifting device comprising:
- a first inner fixed tube, a second inner fixed tube and a cross beam subassembly extending across the first and second inner fixed tubes;
- a pressure-adjustable gas spring arranged in the first inner fixed tube, the pressure-adjustable gas spring has a first gas spring, and a gas source for adjusting a pressure, wherein one end of the gas source is connected with the first gas spring, and another end of the gas source is connected with an adjustment device for adjusting the volume of the gas source, the adjustment device includes a cavity for accommodating the gas source, and a piston, one end of the piston opposite the gas source is connected with a driving subassembly, the driving subassembly comprises a screw, and one end of the screw is connected with the piston and another end of the screw extends out of the cavity, wherein a nut is arranged on the end of the screw extending out of the cavity, a connection tube is arranged outside the nut in a sleeving manner, one end of the connection tube is connected with the cavity, a rotating block is mounted at an opening of an other end of the connection tube, and the rotating block is adapted for receiving a working end of a tool; wherein
- a lifting end of the first gas spring is connected with the cross beam subassembly, a second gas spring is arranged in the second inner fixed tube, and a lifting end of the second gas spring is connected with the cross beam subassembly.

3. The lifting device with a pressure adjustable gas spring according to claim 2, further comprising:
- a synchronization mechanism, wherein the synchronization mechanism comprises:
- a first bracket, wherein one end of the cross beam subassembly is connected with one end of the first bracket, and another end of the first bracket is clearance fit in the first inner fixed tube;
- a second bracket, wherein another end of the cross beam subassembly is connected with one end of the second bracket, and another end of the second bracket is in clearance fit in the second inner fixed tube;
- a first flexible traction component, wherein one end of the first flexible traction component is connected with the second inner fixed tube, and after the first flexible traction component is flexibly fitted to the one end of the second bracket, the one end of the first bracket and the another end of the first bracket, another end of the first flexible traction component is connected with the first inner fixed tube; and
- a second flexible traction component, wherein one end of the second flexible traction component is connected with the first inner fixed tube, and after the second flexible traction component is flexibly fitted to the one end of the first bracket, the one end of the second bracket and the another end of the second bracket, the another end of the second flexible traction component is connected with the second inner fixed tube.

4. The lifting device according to claim 2, wherein the first inner fixed tube comprises a first inner tube and a first connection piece, the first connection piece is located in the first inner tube and fixed to the first inner tube,
- the second inner fixed tube comprises a second inner tube and a second connection piece, and the second connection piece is located in the second inner tube and fixed to the second inner tube,
- one end of the first flexible traction component is fixedly connected with the second connection piece, the another end of the first flexible traction component is fixedly connected with the first inner fixed tube, one end of the second flexible traction component is fixedly connected with the first connection piece, and the another end of the second flexible traction component is connected with the second inner fixed tube;
- the first bracket comprises:
- a first bracket body;
- a first turning component rotatably mounted on a first shaft in one end of the first bracket body;
- a second turning component rotatably mounted at another end of the first shaft; and a third turning component rotatably mounted at another end of the first bracket body;
- the second bracket comprises a second bracket body;
- a fourth turning component rotatably mounted on a second shaft in one end of the second bracket body;
- a fifth turning component rotatably mounted at another end of the second shaft; and
- a sixth turning component rotatably mounted at another end of the second bracket body;
- the first flexible traction component is flexibly fitted to the fourth turning component, the first turning component and the third turning component; the second flexible traction component is fitted to the second turning component, the fifth turning component and the sixth turning component;
- the lifting device also comprises:
- a first movable outer tube with one end fixed to one end of the cross beam subassembly, wherein the first movable outer tube is arranged on the first inner fixed tube in a sleeving manner;
- a second movable outer tube with one end fixed to another end of the cross beam subassembly, wherein the second movable outer tube is arranged on the second inner fixed tube in a sleeving manner; and a first sliding guide subassembly arranged between the first movable outer tube and the first inner tube; and a second sliding guide subassembly arranged between the second movable outer tube and the second inner tube.

5. The lifting device according to claim 4, wherein the first sliding guide subassembly and the second sliding guide subassemblies each comprise two side plate subassemblies arranged oppositely;
the two side plate subassemblies are detachably connected;
first rolling groups are arranged at the upper ends of both the first and second side plates;
second rolling groups are arranged at the lower ends of both the first and second side plates;
the first rolling groups and the second rolling groups comprise left and right waist-shaped ring slots; and
a plurality of balls are uniformly distributed in the waist-shaped ring slots.

6. The lifting device with a pressure-adjustable gas spring according to claim 2, wherein the cross beam subassembly comprises two side walls and a bottom wall which form a slot with openings in two ends in an encircling manner, and each of the openings is connected with a rotating joint; and
open slots are formed on bottom surfaces of the rotating joints.

7. A lifting table comprising:
a lifting device, the lifting device having a first inner fixed tube, a second inner fixed tube and a cross beam subassembly extending across the first and second inner fixed tubes;
a pressure-adjustable gas spring arranged in the first inner fixed tube, the pressure-adjustable gas spring has a first gas spring, and a gas source for adjusting a pressure, wherein one end of the gas source is connected with the first gas spring, and another end of the gas source is connected with an adjustment device for adjusting the volume of the gas source, the adjustment device includes a cavity for accommodating the gas source, and a piston, one end of the piston opposite the gas source is connected with a driving subassembly, the driving subassembly comprises a screw, and one end of the screw is connected with the piston and another end of the screw extends out of the cavity, wherein a nut is arranged on the end of the screw extending out of the cavity, a connection tube is arranged outside the nut in a sleeving manner, one end of the connection tube is connected with the cavity, a rotating block is mounted at an opening of an other end of the connection tube, and the rotating block is adapted for receiving a working end of a tool; wherein
a lifting end of the first gas spring is connected with the cross beam subassembly, a second gas spring is arranged in the second inner fixed tube, and a lifting end of the second gas spring is connected with the cross beam subassembly; and
a tabletop board is arranged on the cross beam subassembly, a bottom end of the first inner fixed tube is connected with a first supporting foot, and a bottom end of the second inner fixed tube is connected with a second supporting foot.

8. The lifting table according to claim 7, further comprising:
a synchronization mechanism, wherein the synchronization mechanism comprises:
a first bracket, wherein one end of the cross beam subassembly is connected with one end of the first bracket, and another end of the first bracket is clearance fit in the first inner fixed tube;
a second bracket, wherein another end of the cross beam subassembly is connected with one end of the second bracket, and another end of the second bracket is in clearance fit in the second inner fixed tube;
a first flexible traction component, wherein one end of the first flexible traction component is connected with the second inner fixed tube, and after the first flexible traction component is flexibly fitted to one end of the second bracket, one end of the first bracket and another end of the first bracket, another end of the first flexible traction component is connected with the first inner fixed tube; and
a second flexible traction component, wherein one end of the second flexible traction component is connected with the first inner fixed tube, and after the second flexible traction component is flexibly fitted to one end of the first bracket, one end of the second bracket and another end of the second bracket, another end of the second flexible traction component is connected with the second inner fixed tube.

9. The lifting table according to claim 7, wherein the first inner fixed tube comprises a first inner tube and a first connection piece, the first connection piece is located in the first inner tube and fixed to the first inner tube,
the second inner fixed tube comprises a second inner tube and a second connection piece, and the second connection piece is located in the second inner tube and fixed to the second inner tube,
one end of the first flexible traction component is fixedly connected with the second connection piece, another end of the first flexible traction component is fixedly connected with the first inner fixed tube, one end of the second flexible traction component is fixedly connected with the first connection piece, and another end of the second flexible traction component is connected with the second inner fixed tube;
the first bracket comprises:
a first bracket body;
a first turning component rotatably mounted on a first shaft in one end of the first bracket body;
a second turning component rotatably mounted at another end of the first shaft; and a third turning component rotatably mounted at another end of the first bracket body;
the second bracket comprises a second bracket body;
a fourth turning component rotatably mounted on a second shaft in one end of the second bracket body;
a fifth turning component rotatably mounted at another end of the second shaft; and
a sixth turning component rotatably mounted at another end of the second bracket body;
the first flexible traction component is flexibly fitted to the fourth turning component, the first turning component and the third turning component; the second flexible traction component is fitted to the second turning component, the fifth turning component and the sixth turning component;
the lifting device also comprises:
a first movable outer tube with one end fixed to one end of the cross beam subassembly, wherein the first movable outer tube is arranged on the first inner fixed tube in a sleeving manner;
a second movable outer tube with one end fixed to another end of the cross beam subassembly, wherein the second movable outer tube is arranged on the second inner fixed tube in a sleeving manner; and a first sliding guide subassembly arranged between the first movable outer tube and the first inner tube; and a second sliding guide subassembly arranged between the second movable outer tube and the second inner tube.

10. The lifting table according to claim 9, wherein the first sliding guide subassembly and the second sliding guide subassembly each comprise two side plate subassemblies arranged oppositely;
   the two side plate subassemblies are detachably connected;
   first rolling groups are arranged at the upper ends of both the first and second side plates;
   second rolling groups are arranged at the lower ends of both the first and second side plates;
   the first rolling groups and the second rolling groups comprise left and right waist-shaped ring slots; and
   a plurality of balls are uniformly distributed in the waist-shaped ring slots.

11. The lifting table according to claim 7, wherein the cross beam subassembly comprises two side walls and a bottom wall which form a slot with openings in two ends in an encircling manner, and each of the openings is connected with a rotating joint; and
   open slots are formed on bottom surfaces of the rotating joints.

\* \* \* \* \*